J. I. SHARPE.
HEATER FOR ELECTRIC AUTOMOBILES.
APPLICATION FILED DEC. 15, 1919.
1,364,212. Patented Jan. 4, 1921.
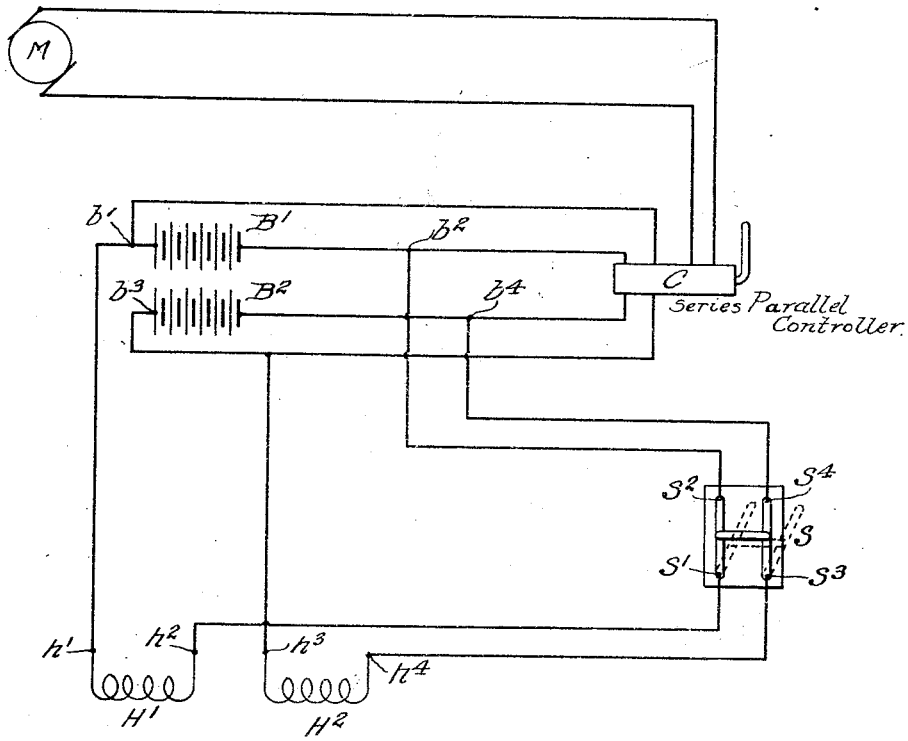

UNITED STATES PATENT OFFICE.

JAY I. SHARPE, OF ZANESVILLE, OHIO.

HEATER FOR ELECTRIC AUTOMOBILES.

1,364,212.   Specification of Letters Patent.   Patented Jan. 4, 1921.

Application filed December 15, 1919. Serial No. 344,852.

*To all whom it may concern:*

Be it known that I, JAY I. SHARPE, a citizen of the United States, residing at Zanesville, in the county of Muskingum and State of Ohio, have invented certain new and useful Improvements in Heaters for Electric Automobiles, of which the following is a specification.

The present invention relates to electric heaters for use on electric automobiles.

As is well known, electric automobiles have as a source of power an electric storage battery. In order to afford the usual regulation of speed, the battery is divided in two sections which are connected, at will, in series to obtain the normal low speed and in parallel for high speed, the change being made by the usual controller.

It has been customary to heat the automobile by an electric heater connected to the battery. Heaters heretofore used have been designed for a voltage approximately equal to the potential difference between the opposite ends of one of the mentioned battery sections and have been permanently connected across such sections. This design and this mode of connection were found necessary in order to maintain approximately uniform and constant heat independently of the speed of the vehicle.

The present invention has as its principal object an electric heating system which is absolutely independent of the motor circuit and at the same time affords material advantages incident to the operation of the vehicle.

The invention consists essentially of two electric heater elements and means for simultaneously connecting them to or disconnecting them from the battery, one element being connected to one battery section and the other element to the other battery section, independently of each other and of the motor circuit.

For a fuller understanding reference is had to the accompanying drawing which is a diagrammatic representation of the arrangement embodying the invention.

In the drawing $B_1$ and $B_2$ represent the two battery sections connected to the controller C to which is also connected the motor M in the usual way. The form of the controller and the mode of interconnecting the motor and the battery sections form no part of the invention.

$H_1$ and $H_2$ represent two heater elements or units. Terminals $h_1$ and $h_3$ of the heaters $H_1$ and $H_2$ are connected to terminals $b_1$ and $b_3$ of battery sections $B_1$ and $B_2$ respectively, while the terminals $h_2$ and $h_4$ are connected to switch terminals $s_1$ and $s_3$, respectively, the battery terminals $b_2$ and $b_4$ being directly connected to switch terminals $s_2$ and $s_4$ respectively. The switch S may be an ordinary double pole switch for simultaneously making or breaking connection between $s_1$ and $s_2$ and between $s_3$ and $s_4$, as is well understood.

When the switch is closed, heater $H_1$ is connected to battery section $B_1$ and heater $H_2$ to section $B_2$.

The significance of the arrangement is this:

The heater may be continuously operated without unbalancing the battery sections. The two battery sections will contribute in the same measure both to the motor and to the heating system and therefore remain continuously in balanced condition. In other words the rate of discharge is substantially the same in both sections, whether the vehicle is standing still, in high speed or low speed, which not only promotes efficiency and smooth operation of the plant as a whole, but also simplifies the recharging operation because since the individual cells of the two sections will always be charged or discharged to the same extent, the battery may be recharged as a whole in the usual way without special precautions or time-consuming manipulations.

It is understood that the form of connections between the two battery sections, the heater elements and the switch-mechanism and the form of the switch mechanism may be modified within wide limits.

I claim:

1. In an automobile the combination of two battery sections and means for operating the sections in series and in parallel, two electric heater elements, separate electric connections between the two heater elements and the battery sections respectively and means for simultaneously controlling said connections.

2. In an automobile for use in combination with a battery having two sections operable in series and in parallel, two electric heater elements, means for separately connecting the said elements to the different sections of the battery and means for simultaneously controlling said connecting means.

In testimony whereof, I affix my signature.

JAY I. SHARPE.